United States Patent [19]

Bryan et al.

[11] Patent Number: 4,880,597
[45] Date of Patent: Nov. 14, 1989

[54] ALLOY COATED FUEL CLADDING

[75] Inventors: William J. Bryan, Granby; Nathan Fuhrman, Plainville, both of Conn.

[73] Assignee: Combustion Engineering, Inc., Windsor, Conn.

[21] Appl. No.: 213,567

[22] Filed: Jun. 24, 1988

Related U.S. Application Data

[63] Continuation-in-part of Ser. No. 81,969, Aug. 5, 1987, Pat. No. 4,824,634.

[51] Int. Cl.$^4$ .................................................. G21C 3/00
[52] U.S. Cl. ...................................... 376/419; 427/437; 427/438
[58] Field of Search ............. 376/419; 427/405, 419.1, 427/419.7, 437, 438

[56] References Cited

U.S. PATENT DOCUMENTS

| 4,029,545 | 6/1977 | Gordon | 376/419 |
| 4,510,182 | 4/1985 | Cornils | 427/162 |
| 4,582,676 | 4/1986 | Chubb | 376/414 |
| 4,587,087 | 5/1986 | Radford | 376/417 |
| 4,587,088 | 5/1986 | Radford | 376/419 |
| 4,824,634 | 4/1989 | Fuhrman | 376/419 |

Primary Examiner—Donald P. Walsh
Attorney, Agent, or Firm—John H. Mulholland

[57] ABSTRACT

A fuel element for a nuclear reactor having a zirconium tin alloy cladding tube, with a thin coating of enriched boron-containing alloy burnable poison, such as nickel-thallium-boron deposited from a reducing agent by an electroless plating process.

4 Claims, 1 Drawing Sheet

ALLOY COATED FUEL CLADDING

RELATED APPLICATION

This application is a continuation-in-part of U.S. patent application Ser. No. 081,969 filed Aug. 5, 1987 (now U.S. Pat. No. 4,824,634) for "Element with Burnable Poison Coating" by the inventors.

BACKGROUND OF THE INVENTION

This invention relates to nuclear fuel elements and, in particular, the provisions of fuel elements with a burnable poison coating in the form of a thin layer of a boron-containing alloy on the inside of a cladding tube. The burnable poison is deposited as an alloy using an electroless nickel-thallium-boron plating process that utilizes boron-containing reducing agents on the inside of a zirconium-alloy cladding tube.

A nuclear fuel element of the type involved in the invention is part of a fuel assembly. Heretofore, typically, fuel assembly designs have employed fixed lattice burnable poison rods to control early-in-life reactivity and power peaking. These rods have become a necessary design feature for the fuel management of first cores of light water reactors as well as in schemes to achieve extended burnups and reduced radial neutron leakage. Such rods displace fuel rods within the assembly lattice which increases the core average linear heat generation rate and local peaking factors.

Alternate approaches have been proposed that place burnable poison material inside the fuel rods so that much less fuel material is displaced, for example, as boride coatings on the $UO_2$ pellets. Such coatings, however, while adhering when first applied, tend to spall off under the stresses of the irradiation environment in the nuclear reactor core, in part because of difficulty in matching the thermal expansion behavior of the coating to that of the fission material or $UO_2$ pellet. Attempts to incorporate boron compounds as mixtures within the $UO_2$ pellets have not been successful because of volatilization of boron species during high temperature fabrication processes and redistribution of the boron under irradiation.

U.S. Pat. No. 3,625,821 discloses an electroplated inside tube coating of a matrix meta and boron compound of, for example, nickel, iron manganese or chrome. Boron nitride (BN), titanium boride ($TiB_2$) and zirconium boride ($ZiB_2$) are specifically named. Electroplating boron compounds onto the Zircaloy substrate, as described in U.S. Pat. No. 3,625,821, has been shown to cause the substrate to hydride. This pickup of hydrogen causes the material to embrittle effecting its physical properties.

U.S. Pat. No. 4,695,476 shows vapor deposition of volatilized boron compounds on the inside of fuel rod cladding.

For further background, see U.S. Pat. Nos. 3,925,151; 4,372,817; 4,560,575; 4,566,989; 4,582,676; 4,587,087; 4,587,088; and 4,636,404.

SUMMARY OF THE INVENTION

The invention involves an improved fuel element with a burnable poison coating which substantially overcomes problems of spalling and coating integrity because of the closely matched thermal expansion coefficients of the substrate and coating material and the action of fission sintering to enhance adhesion of the coating to the substrate.

The invention includes coating a thin layer of a boron-containing alloy on the inside surface of the zirconium alloy cladding tube of the fuel rod. The preferred boron-containing alloy is an electroless nickel-thallium-boron plating or coating known in the art as SAE AMS 2433. It offers a unique combination of hardness, ductility and low coefficient of friction while not having any significant effect on tensile properties of the zirconium alloy cladding tube. The adhesion of the nickel-thallium-boron coating to the zirconium alloy cladding tube is dependent on tube preparation, i.e. minimizing surface contamination. The substrate material is compatible with the coating and adhesion is excellent. Therefore, the coating is less likely to deteriorate under irradiation than would similar coatings on the $UO_2$ pellets.

A suitable thin layer or coating of homogeneous amorphous nickel-thallium-boron on the inside surface of the cladding tube is applied by using a method of electroless plating, or chemical deposition using sodium borohydride reducing agents, on the inside of nuclear fuel rod cladding.

The liquid process bath contains nickel, approximately 5 percent by weight boron, 2.5 to 6 percent by weight thallium, and the reducing agents. The boron percent by weight content and isotopic content, together, essentially determine the end product burnable poison characteristics. The boron is preferably initially enriched in the $B^{10}$ isotope to a level in the range of 50 to 80 percent by weight, typically 50 percent. (However, both natural and enriched boron will work).

Eagle-Picher Industries, Inc., Quapaw, Okla. 74363, enriches the boron by a process of fractional distillation. Boron trifluoride ($BF_3$) dimethylether complex is dissociated in a fractional distillation column. $B^{10}F_3$-dimethylether reassociates more readily so that $B^{11}$ concentrates in the vapor phase and $B^{10}$ concentrates in the liquid phase. Any enrichment of $B^{10}$ can be produced by the Eagle-Picher process.

DETAILED DESCRIPTION

Figure 1:
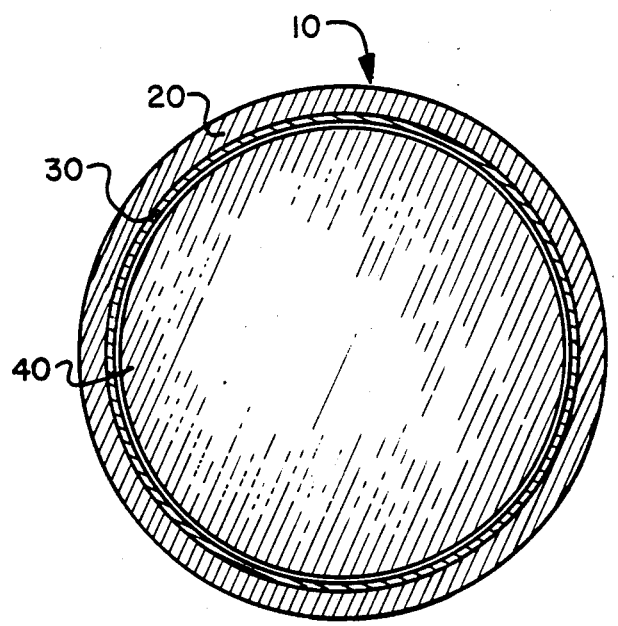
FIG. 1 is a cross-sectional view of a fuel element with a burnable poison coating made according to the principles of the invention.

The numeral 10 generally indicates a fuel element constructed according to the principles of the invention for use in a nuclear reactor. The fuel element includes a zirconium-tin alloy cladding tube or substrate 20, a boron-containing compound coating 30 of SAE ASM 2433 electroless nickel-thallium-boron on the inside of the zirconium-tin alloy cladding tube and pellets 40 of fissionable materials such as $UO_2$. The zirconium-tin alloy is, typically, Zircaloy-2 or Zircaloy 4.

The nickel-thallium-boron plating 30 described herein uses an electroless process, and therefore the coating is applied very uniformly over the length of the tube. Also, providing certain process controls are utilized, the size of the tube being processed has no effect on the application of a uniform even coating. This capability permits coating without the characteristic build-up experienced with other plating materials such as hard chrome and nullifies the need for "grinding back" after the plating process. The rate of deposition of the nickel boron alloy and the supporting process controls, developed for the plating process, permit very precise control over the thickness of the coating. Thickness can be controlled very accurately over the range of 0.0001" to 0.0010".

The quality of adhesion of the coating to the substrate 20 is dependent on many factors including preparation of tubes ad contamination. The major one, of course, is the substrate itself, as the nickel-thallium-boron alloy is not necessarily compatible with all metallic substrate materials. However, progress is being made to develop process systems which will permit the application to some of these types of materials. One such development currently being worked on is plating over chrome to minimize cost. However, adhesion to zirconium alloys is excellent.

Nickel-thallium-boron coatings are nodular in nature and the size of the nodules increases markedly as the coating thickness is increased. The growth of the plated surface takes place in a manner that has the effect of reducing the number of nodules on the surface. Therefore, the structure of the surface of the coating can vary but does not have any real bearing on surface finish quality.

It has been found that with electroless nickel-thallium-boron coatings the surface finish of the coating conforms very closely to the original tube substrate finish prior to plating, possibly due to the nodular characteristics of the coating build.

Due to the nodular construction of the coated surface, it has been found necessary to use microhardness techniques for measuring the hardness of nickel-thallium-boron coatings. A test program was conducted to evaluate the hardness of nickel-thallium-boron in which samples were coated to a minimum thickness of 1 mil (0.001"). Hardness measurements were then made on polished cross-sections of the coating.

Hardness tests were conducted at various stages of heat treatment. These testing results indicated an as-plate hardness of Rc58 increasing to a hardness of Rc 72 at 800° F., demonstrating that effective heat treatment enhances hardness of the coating.

The nickel-thallium-boron alloy coating also provides exceptional wear characteristics when compared to other plating systems which are currently available. Tests have been conducted to evaluate the effectiveness of nickel-thallium-boron coatings which show a marked improvement over a coating such as hard chrome.

Typical wear scar pattern comparisons have been made for nickel-thallium-boron, hard chrome and nickel phosphorous for the purposes of comparing relative performance under a particular set of conditions. The magnitude of the wear scar is an indication of the wear resistance of the coatings. The wear scar area was measured using a Brush Surfanalyzer. Several scans were made across each wear area and the area under the curves obtained for each scan were measured with a planimeter in square millimeters. The higher values obtained for hard chrome and nickel phosphorous indicate lower wear resistance.

Longer duration tests were conducted to compare nickel-thallium-boron and hard chrome coatings. The wear scar measurements as a function of test cycles show that the coating has a relatively low coefficient of friction. The low coefficient of friction enhances the pellet clad interaction (PCI) resistance of the fuel rod by allowing the fuel pellets to move with less resistance during operation. Its exceptional wear characteristics also limit wear of the cladding due to pellet interaction.

As a result of controlled laboratory testing, it has been determined that the nickel-thallium-boron process does not appear to have any negative effect on the mechanical properties of the zirconium-alloy (Zircaloy) cladding tube. This is a very important consideration, particularly on materials where there is a real concern regarding hydrogen embrittlement, which can result from the application of other plating processes due to hydrogen pickup. The reason why this particular coating does not lead to hydrogen pickup is not known but other electroless coatings have been proven to impart embrittlement.

The tube 10 is made of a zirconium-tin alloy which is commonly called Zircaloy-2 or Zircaloy-4. The compositions of Zircaloy-2 and Zircaloy-4 are shown in Table I, but it should be realized that each will contain some other impurities within tolerance limits known to those skilled in the art. Table I shows the alloying constituents and it should be remembered that the remainder is zirconium and that all ranges are given in percent by weight. Thus, it will be seen that the invention provides a nuclear fuel element having a burnable poison coating in the form of a thin layer of nickel-thallium-boron-containing alloy. The use of these improved elements eliminate the requirement of displacing fuel rods within the assembly lattice and therefore minimizes the fuel material that is displaced in the nuclear reactor core.

The application of nickel on the zirconium alloys (Zircaloy) also enhances the hydrogen transport from the interior of the fuel rod, thus, preventing the formation of hydride blisters on the Zircaloy clad. Therefore, fuel rods coated with nickel-thallium-boron are able to withstand higher levels of internal hydrogen before the formation of hydride blisters.

TABLE I

| ZIRCONIUM-TIN ALLOY (% BY WEIGHT) | | | | |
|---|---|---|---|---|
| | Zircaloy-2 | | Zircaloy-4 | |
| | Range | Typical | Range | Typical |
| Tin | 1.20 to 1.70 | 1.55 | 1.20 to 1.70 | 1.53 |
| Iron | 0.07 to 0.20 | 0.14 | 0.18 to 0.24 | 0.22 |
| Chromium | 0.05 to 0.15 | 0.08 | 0.07 to 0.13 | 0.10 |
| Nickel | 0.03 to 0.08 | 0.06 | — | — |
| Niobium (columbium) | | | — | — |
| Oxygen | A | A | A | A |
| Iron + chromium + nickel | 0.18 to 0.38 | 0.28 | — | 0.32 |
| Iron + chromium | — | | 0.28 to 0.37 | |

The remainder is zirconium and impurities within tolerable amounts.

We claim:

1. In a fuel element for use in a nuclear reactor which includes a fissionable material contained within a zirconium-alloy cladding tube, the improvement which comprises:
    a coating on the inside of the zirconium-alloy cladding tube, said coating including a nickel-thallium-boron burnable poison compound.

2. The fuel element of claim 1 in which the burnable poison compound is a deposit from an electroless plating process which includes a boron-containing reducing agent.

3. The fuel element of claim 1 in which the burnable poison compound includes boron enriched in $B^{10}$ to the range of 50 to 80 percent by weight to give a desired nuclear poison level for use in the nuclear reactor.

4. The fuel element of claim 1 in which the zirconium-alloy is from the group Zircaloy-2 or Zircaloy-4.

* * * * *